United States Patent
Englund (10) Patent No.: US 9,658,627 B2
(45) Date of Patent: May 23, 2017

(54) DETECTION OF IMMINENT CONTROL INSTABILITY

(75) Inventor: Norman J. Englund, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1627 days.

(21) Appl. No.: 13/102,043

(22) Filed: May 5, 2011

(65) Prior Publication Data
US 2012/0283982 A1 Nov. 8, 2012

(51) Int. Cl.
*G05D 19/02* (2006.01)

(52) U.S. Cl.
CPC .................................. *G05D 19/02* (2013.01)

(58) Field of Classification Search
CPC .......... G05D 19/00; G05D 19/02; G01H 3/10; G01H 3/04; G01H 1/06
USPC .................... 700/33, 35, 37, 42, 54, 71, 280
See application file for complete search history.

(56) References Cited

U.S. PATENT DOCUMENTS

| | | | |
|---|---|---|---|
| 5,481,575 A | 1/1996 | Bäck et al. | |
| 5,768,124 A * | 6/1998 | Stothers et al. ................ | 700/38 |
| 5,935,177 A * | 8/1999 | Cox et al. ......................... | 701/9 |
| 5,994,905 A * | 11/1999 | Franchville .................... | 324/533 |
| 6,876,009 B2 | 4/2005 | Narukawa et al. | |
| 6,876,099 B2 | 4/2005 | Wobben | |
| 2002/0153451 A1 * | 10/2002 | Kiss et al. ................. | 244/17.27 |
| 2005/0141682 A1 | 6/2005 | Wells | |
| 2006/0122765 A1 * | 6/2006 | Nakao et al. ................. | 701/111 |
| 2007/0027675 A1 | 2/2007 | Hertz | |
| 2009/0273488 A1 | 11/2009 | Riser et al. | |
| 2010/0104388 A1 * | 4/2010 | Suzuki et al. ................ | 409/131 |
| 2011/0153182 A1 * | 6/2011 | Sasaki ........................... | 701/111 |
| 2011/0238329 A1 * | 9/2011 | Saarinen et al. ................ | 702/44 |
| 2012/0010744 A1 * | 1/2012 | Yamashita ............. | B23Q 15/12 |
| | | | 700/173 |

FOREIGN PATENT DOCUMENTS

| | | |
|---|---|---|
| JP | 60174918 A | 9/1985 |
| JP | 6459134 A | 3/1989 |
| JP | 2-270619 A | 11/1990 |
| JP | 453536 | 5/1992 |
| JP | 2010247316 A | 11/2010 |
| WO | 9835277 A1 | 8/1998 |

(Continued)

OTHER PUBLICATIONS

Kariwala et al., "Detection and Diagnosis of Plant-wide Oscillations: An application study," IEEE Workshop on Advanced Process Control, Vancouver, Apr. 26-28, 2004, XP009160843.

(Continued)

*Primary Examiner* — Christopher E Everett
(74) *Attorney, Agent, or Firm* — Miller, Matthias & Hull LLP (57) ABSTRACT

Imminent control instability is detected in a system that applies a stimulus to an object. The system provides a parameter signal that represents a system parameter indicating oscillation of the object while the stimulus is being applied to the object. The method comprises monitoring maximum amplitude of a dominant tone in a selected frequency band of the parameter signal; and taking an action to avoid imminent control instability if the maximum amplitude persists over a specified period of time.

20 Claims, 7 Drawing Sheets

(56) References Cited

FOREIGN PATENT DOCUMENTS

WO     WO2010/048996     *   5/2010

OTHER PUBLICATIONS

Charles M. Denegri, "Limit Cycle Oscillation Flight Test Results of a Fighter with External Stores," Journal of Aircraft, vol. 37, No. 5, Sep. 2000, pp. 761-769.
Carlos Canudas-de-Wit et al., "The Oscillation Killer: a Mechanism to Eliminate Undesired Limit Cycles in Nonlinear Systems," 44th IEEE Conf.Dec.Control, Jan. 2005, pp. 1-6.
Chinese Office Action for Application No. 201210136105.0 reported on Sep. 25, 2015.
Japanese Office Action for Application No. 2012-094491 reported on Dec. 22, 2015.
Xiaohong L. Li and Martin J. Brenner, Practical Aeroservoelasticity In-Flight Identification and Adaptive Control, Published by the American Institute of Aeronautics and Astronautics, Inc., AIAA Atmospheric Flight Mechanics Conference Aug. 2-5, 2010, pp. 2-12, Toronto, Ontario Canada.

* cited by examiner

DETECTION OF IMMINENT CONTROL INSTABILITY

BACKGROUND

In control systems, the term "instability" commonly refers to the presence of an oscillation with a continuously-increasing amplitude. As used herein, however, the term "instability" refers to the presence of an undesirable amplitude of at least one oscillatory mode of a system. This undesirable amplitude may be intermittent, constant or continuously increasing.

Oscillations can result from a variety of causes. An oscillation may be the result of resonance, where the mode is excited at its natural frequency in a closed or open loop system. Resulting is a linear instability An oscillation may be the result of free vibration with negative damping, where controller stimulus frequency is unrelated but supplies power. Resulting is a self-excited vibration.

In a control system that applies a stimulus to an object, an oscillation may be caused by a non-linearity such as friction or backlash. Resulting is a limit cycle oscillation. Unlike oscillations caused by linear instabilities, a limit cycle oscillation is saturated and doesn't grow in amplitude. Total phase lag around a control loop that is limit-cycle oscillating is exactly 360 degrees and loop gain is unity.

The onset of instability due to a limit cycle or other oscillation is difficult to ascertain in a control system having a single channel. The difficulty is even greater in a control system having multiple channels due to the difficulty in identifying the channel that caused the initial instability. Moreover, one unstable channel can cause numerous channels to become unstable.

There is a need to quickly detect and control instabilities caused by limit cycle oscillations and other oscillations having undesirable amplitudes.

SUMMARY

According to an aspect herein, imminent control instability is detected in a system that applies a stimulus to an object. The system provides a parameter signal that represents a system parameter indicating oscillation of the object while the stimulus is being applied to the object. The method comprises monitoring maximum amplitude of a dominant tone in a selected frequency band of the parameter signal; and taking an action to avoid imminent control instability if the maximum amplitude persists over a specified period of time.

According to another aspect herein, a method comprises using an effector to apply a stimulus to an object; generating a signal representing a parameter that indicates oscillation of the object while the stimulus is being applied to the object; monitoring maximum amplitude of a dominant tone in each of a plurality of different frequency bands of the parameter signal; and selectively adjusting control parameters that would otherwise tend to trigger oscillation modes at specific frequencies.

According to another aspect herein, a system comprises an effector for applying a stimulus to an object; a sensor for measuring a parameter indicating oscillation of the object while the stimulus is being applied to the object; and a control for monitoring maximum amplitude of a dominant tone in a selected frequency band of the parameter signal, and taking an action to avoid imminent control instability if the maximum amplitude persists over a specified period of time.

According to another aspect herein, a system comprises an effector for applying a stimulus to an object; a sensor for measuring a parameter indicating oscillation of the object while the stimulus is being applied to the object; and a first control having adjustable parameters that tend to trigger oscillation modes at specific frequencies. The system further comprises a second control, responsive to the sensor, for determining maximum amplitude of a dominant tone in each of a plurality of frequency bands of the measured parameter; and automatically adjusting those parameters so as not to trigger those oscillation modes at the specific frequencies.

DETAILED DESCRIPTION

Figure 1:
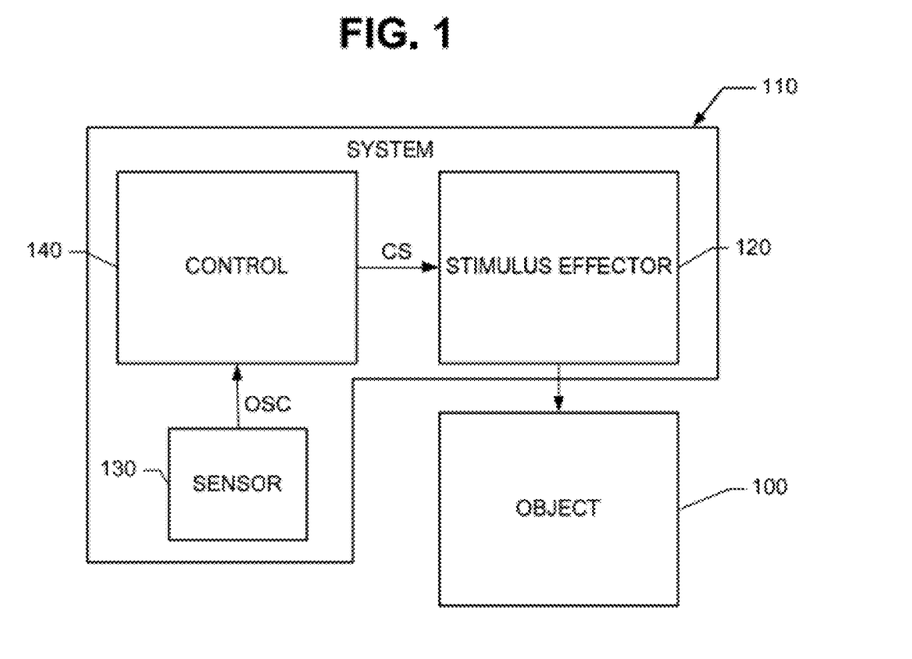
FIG. 1 is an illustration of a system that applies a stimulus to an object.

Reference is made to FIG. 1, which illustrates a system 110 including an effector 120 for applying a stimulus to an object 100. The stimulus could be a pressure, force, position, temperature, velocity or other, or a combination of stimuli. For example, the stimulus effector 120 may include at least one actuator.

A sensor 130 monitors feedback or another parameter that indicates oscillatory behavior of the object 100. The sensor 130 generates a parameter signal OSC. In some embodiments, the signal OSC may be feedback for a closed loop system. In other embodiments, the signal OSC may represent another parameter that is monitored for oscillation (e.g. vibration in a pressure control system, where the pressure signal was the actual feedback).

The system 110 further includes a control 140 for controlling the stimulus effector 120. The control 140, which could be open loop or closed loop, generates a control signal CS that controls the stimulus in response to the parameter signal OSC.

During operation of the system 110, external stimuli may also be applied to the object 100. For example, air flowing over the object 100 may apply aerodynamic forces to the object 100. These external stimuli are not applied by the stimulus effector 120.

The system 110 could be simple or complex. A simple system might include single channel with an open loop control. A complex system such as an aircraft wing actuator system might have multiple channels with closed loop controls.

Figure 2:
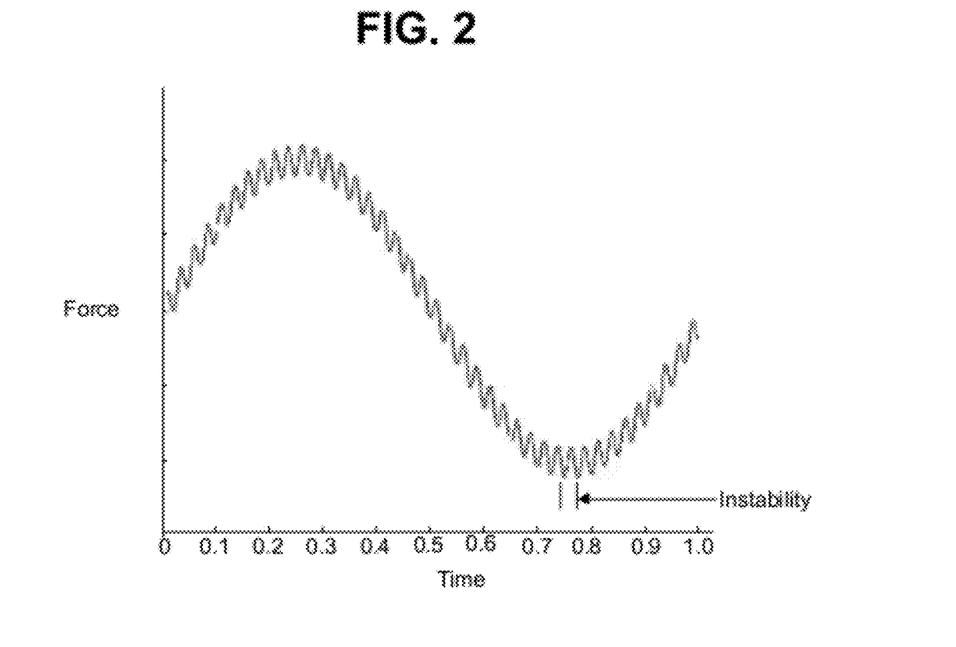
FIGS. 2 and 3 are illustrations of instability in a control system.
Figure 3:
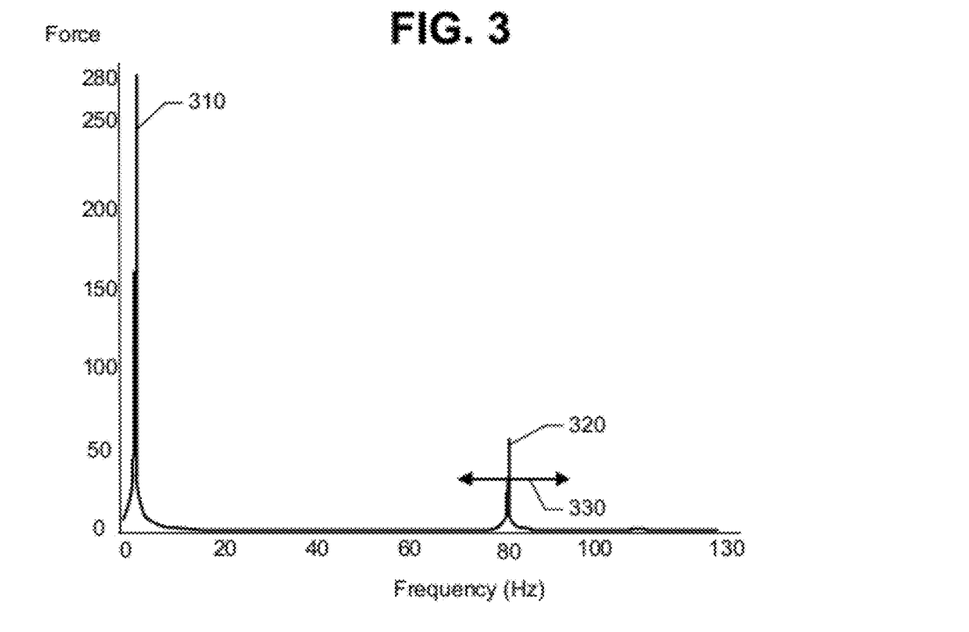

FIGS. 2 and 3 are time domain and frequency domain representations of a single cycle of a sinusoidal force applied to the object 100 over time. The frequency domain representation shows a higher amplitude component 310 applied at 2.5 Hz. This higher amplitude component 310 corresponds to an operational condition.

The frequency domain representation also shows a lower amplitude component 320 at around 80 Hz. The arrow 330 indicates that component 320 varies (e.g., ±10 Hz) over a spectral range. This variance may be the result of changing parameters, such as the positional stroke of a hydraulic actuator changing the resonant frequency of the system.

This lower amplitude component 320 could be a resonance. If its amplitude is high enough, the resonance may indicate the onset of an instability.

For this particular example, however, the lower amplitude component 320 represents instability due to a limit cycle oscillation. Limit cycle oscillations are typically sinusoidal. However, the limit cycle oscillations could be non-sinusoidal. For instance, instabilities due to static and coulomb friction produce limit cycle oscillations that are characteristically triangular shaped with lower frequency. When moving below a critical velocity the oscillation wave shape will be sawtoothed. Backlash non-linearities can cause limit cycle oscillations that are shaped somewhat like square waves.

In some instances, a limit cycle oscillation may have erratic frequency content and may appear as a square wave with multiple harmonics. Energy contributions of the harmonics in these waveforms may be greater than the fundamental.

Figure 4:
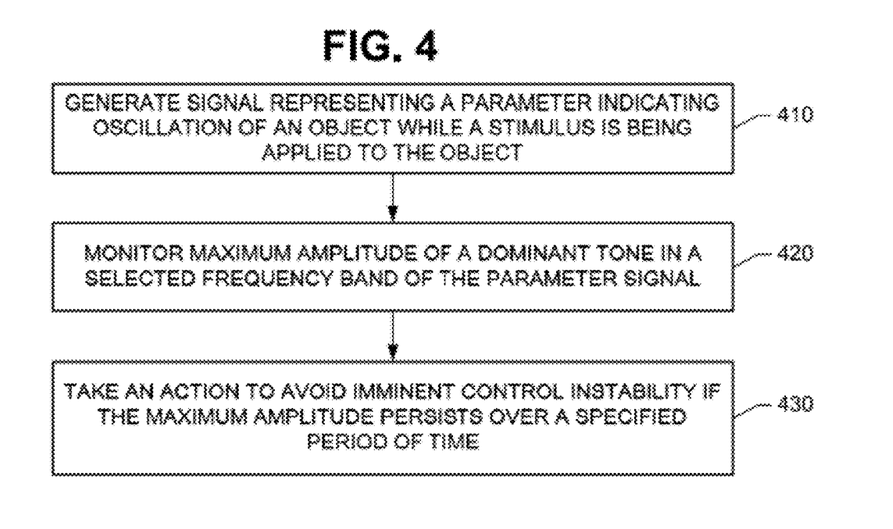
FIG. 4 is an illustration of a method of detecting imminent control instability in a system that applies a stimulus to an object.

Additional reference is now made to FIG. 4, which illustrates a method, implemented in the control 140, for detecting and avoiding control instability due to limit cycle oscillations and other oscillations having undesirable amplitudes. At block 410, the parameter signal OSC is generated. The parameter signal OSC represents a parameter indicating oscillation of the object 100 while a stimulus is being applied to the object 100.

At block 420, the control 140 monitors maximum amplitude of a dominant tone in a selected frequency band of the parameter signal OSC. If the maximum amplitude persists (e.g., exceeds a threshold) over a specified period of time, then imminent control instability is assumed.

The amplitude can persist over a spectral range. Thus, the spectral band, not a specific frequency, is monitored.

In some embodiments, the dominant tone can be determined by a priori knowledge of the object 100 and the system 110. For example, the dominant tone may be a multiple of the driving frequency of the system 110. The driving frequency may be monitored as a function of error (that is, the difference between command and feedback).

In other embodiments, the dominant tone may be found by analyzing the frequency domain representation of the parameter signal OSC. As an example, when the parameter signal OSC is analyzed by performing an FFT, a matrix can be constructed with the first column being the frequency and the second being the amplitude for the corresponding frequency. For the representation of FIG. 3, if the matrix was searched for amplitudes exceeding 10 lbs, for instance, one amplitude would be found at 2.5 Hz (270 lbs) and another amplitude would be found at 80 Hz (50 lbs). Since the system 110 is being driven at 2.5 Hz, that frequency/amplitude would be ignored.

At block 430, an action is taken to avoid imminent control instability if the maximum amplitude exceeds a threshold over a specified period of time. Examples of actions include, but are not limited to, shutting down the system 110, providing a warning for operator intervention, and varying gain of the control 140 in order to avoid the instability. As an example of varying the gain, the driving frequency is monitored and, if the error limit was exceeded, proportional gain of the control 140 is lowered. This would be beneficial, for instance, when the system 110 is required to be driven at or near its resonant frequency.

The method of FIG. 4 offers a quick and simple approach to avoiding control instability such as limit cycle oscillations. Correlation of spectral peaks is not required. Analysis of phase information is not required. Oscillations below a specific amplitude value are ignored. Only the maximum amplitude and corresponding frequency content are monitored to determine whether control instability is imminent. The triggering oscillation may be detected and the desired action invoked after only one cycle of oscillation.

The method of FIG. 4 can detect oscillations in a bounded spectral area that is marginally equal to, less than or greater than a target frequency. The method also detects whether oscillations are absent from a bounded spectral area. For example, the control 140 has a default condition in which an oscillation is in a bounded spectral area. Undesirable environmental factors or other factors may cause the frequency of this oscillation to move out of the bounded area, triggering the appropriate action specified by the control 140.

Detection of only the dominant tone is suited for oscillations that are sinusoidal. However, a method herein is not so limited. A method herein can also detect instability on an oscillatory signal having harmonics. By monitoring energy of the dominant tone plus harmonics of this tone, imminent control instability due to non-sinusoidal limit cycle oscillations can be detected and avoided. In certain systems, the oscillation of the fundamental frequency might be a low amplitude, but damaging energy may exist at the harmonics. The control 140 can evaluate the energy content across the spectrum. An example would be a limit cycle oscillation that results in a square wave type waveform where the contributions are the odd harmonics of the fundamental frequency. The control 140 may find the peaks across the spectral range and identify them as harmonics, and sum over the amplitudes to get a total.

A method herein is not limited to limit cycle oscillations. It can also detect imminent instability due to resonance excitations and oscillations with negative damping (self excited vibrations).

A method herein may be applied to slow systems such as batch processing and heat treatment. A method herein may be applied to faster systems such as marine navigation, and even faster systems such as hydraulic and electrical force and position actuators. Examples of these faster systems include industrial and medical machinery and robotics, automotive and aircraft laboratory testing, and flight controls.

Figure 5:
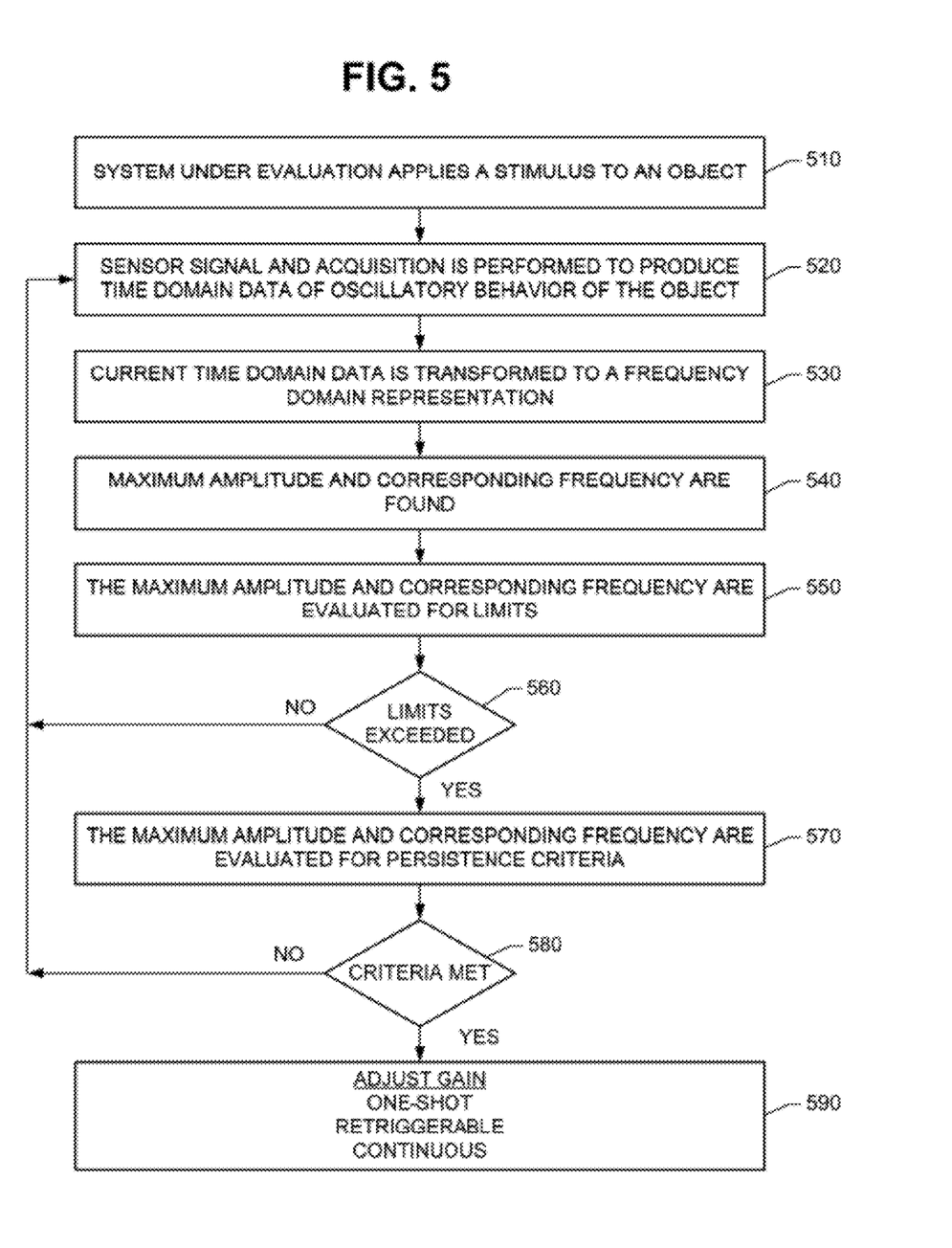
FIG. 5 is an illustration of a method of detecting and avoiding control instability due to limit cycle oscillations.

Reference is now made to FIG. 5, which illustrates an embodiment of a method of detecting and avoiding control instability due to oscillations detected on a measured parameter. At block 510, the system under evaluation applies a stimulus to an object. The stimulus may be applied in response to a control signal or the stimulus may be an indirect energy input such as the speed and feed on a milling machine.

At block 520, sensor signal and acquisition is performed to produce time domain data of oscillatory behavior of the object. The data may be acquired in digital or analog mode. This time domain data is updated periodically.

At block 530, the time domain data is transformed to a frequency domain representation. A transformation method such as Fast Fourier Transform (FFT), zero crossing/time interval/peak-to-peak, optimized Goertzel filtering, or Frequency-to-Voltage conversion may be used.

If the dominant tone is known a priori, a method such as Goertzel filtering is advantageous over FFT. The Goertzel filtering, unlike the FFT, does not require the sample size to be a power of two, and can search for just the frequency of interest.

If the dominant tone is not known a priori, time domain data can be converted to the frequency domain via FFT. The values in each cell will be the amplitudes at different frequencies. The FFT may be performed each time the data is acquired. The dominant frequencies may change over time. Furthermore, the dominant frequencies may appear intermittently, depending on independent factors. For these reasons, in most physical systems, all frequencies may be searched in each subsequent set of time domain data. The spectral band may be well defined, while the dominant tone varies within the band.

For some systems, the frequency domain transformation can be skipped altogether. For instance, oscillations may be computed directly in the time domain by determining AC coupled zero crossing of oscillations in a pass band and their peak values.

At block 540, maximum amplitude and corresponding frequency (that is, frequency at the maximum amplitude) are found. At block 550, the maximum amplitude and corresponding frequency are evaluated for limits.

If the maximum amplitude does not exceed a threshold (block 560), a new set of time domain data is processed (blocks 520 to 550). If the maximum amplitude exceeds the threshold and the corresponding frequency is within the spectral band, the data is evaluated for persistence (block 570). If persistence criteria is not yet met (block 580), a new set of time domain data is processed (blocks 520 to 550).

If the persistence criteria has been met (block 580), an unacceptable oscillatory event is detected and/or imminent instability is assumed. Therefore, action is taken to reduce the amplitude of the oscillation. In the example of FIG. 5, control gain is adjusted (block 590). The undesirable oscillation is detected so quickly that there is enough time to adjust gain before having to shut down the system.

Gain adjustment may be a "one shot" or "retriggerable" or "continuous" mode of operation. If the avoidance action involves reducing gain, then in one shot mode, the gain is reduced when the instability occurs, but does not increase when the system is stable. In the retriggerable mode, the gain can be increased when the system has achieved a stable operation and reduced at the onset of instability (which implies a hysteresis).

In the continuous mode, the dominant tone of the measured parameter (e.g. vibration of test specimen, when controlling hydraulic pressure) is monitored and the gain is adjusted as a function of the amplitude of this parameter. The gain may have maximum and minimum limits. The gain may be constantly varied so that a gain margin is maintained (see FIG. 6). This continuous mode allows the system to operate at maximum response even if the system parameters (plant) may change.

In some embodiments of a method herein, only a single spectral band may be monitored during operation of the system. In other embodiments, multiple spectral bands may be monitored simultaneously. Different portions of the spectrum may be analyzed to adjust different control parameters. Any control having adjustable parameters such as gain adjustments, insertion levels, coercion factors etc. that tend to trigger oscillation modes at specific frequencies could benefit from selective frequency range detection. For example, multiple bands may be analyzed simultaneously in a proportional integral derivative (PID) control or a model reference adaptive control.

Figure 6:
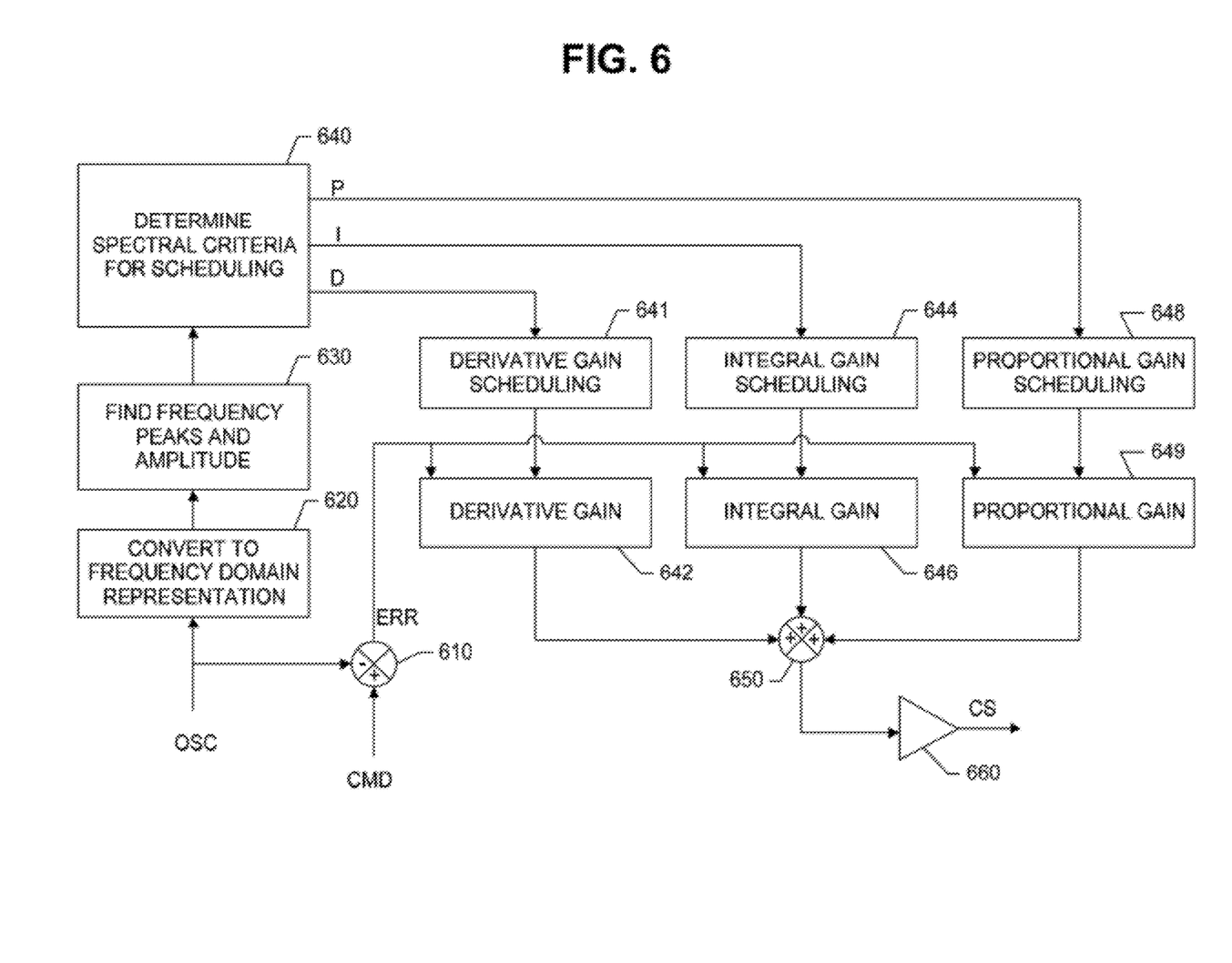
FIG. 6 is an illustration of a proportional integral derivative control.

Reference is now made to FIG. 6, which illustrates a simplified PID control that adjusts gain according to a method herein. Although excessive proportional, integral and derivative gains may have different affects in different systems, in this simplified control, increasing the integrator gain will cause low frequency oscillations, excessive proportional gain will cause relatively mid-frequency oscillations, and excessive derivative gain will excite the higher frequency modes.

During operation, a command or other reference signal (CMD) is subtracted from the measured parameter OSC in summing junction 610, to create an error signal (ERR). The measured parameter OSC is also converted to a frequency domain representation and analyzed for frequency content and magnitude in blocks 620 and 630.

Block 640 determines the spectral criteria for scheduling. If the frequency peak is within spectral criteria (high frequency component) for derivative gain adjustment, derivative gain is adjusted automatically. This adjustment may be performed by selecting a rate in a gain schedule 641 and multiplying the error signal by selected rate (block 642). Thus reduced is a lingering peak of a high frequency component of the parameter signal.

If the frequency peak is within spectral criteria (low frequency component) for integral gain adjustment, integral gain and percent contribution are adjusted automatically. This adjustment may be performed by selecting a gain term from a schedule 644 and multiplying accumulated error by the gain term (block 646). Though not shown, the percentage of the total command signal that can be contributed from the error integration function may also be adjusted by this same method. Thus reduced is a lingering peak of a low frequency component of the parameter signal.

If the frequency peak is within spectral criteria (intermediate component) for proportional gain adjustment, proportional gain is automatically adjusted. For instance, the proportional adjustments to the gain are based on the absolute values of feedback signal oscillations (within the spectral criteria) in real time (blocks 648-649).

The adjusted components are summed at junction 650 and amplified at amplifier 660. An output of the amplifier 660 produces a control signal (CS), which is supplied to the stimulus effector.

The proportional, integral and derivative gains often result in the excitation of different areas of the spectrum when the gain and phase margins are reduced to zero. As an example, the operating frequency may be DC to 1 Hz with instabilities due to excessive integral gain around 5 Hz, while excessive proportional gain may cause oscillations in the 12 Hz region and the derivative gain may cause oscillations in the 40 Hz region.

Figure 7:
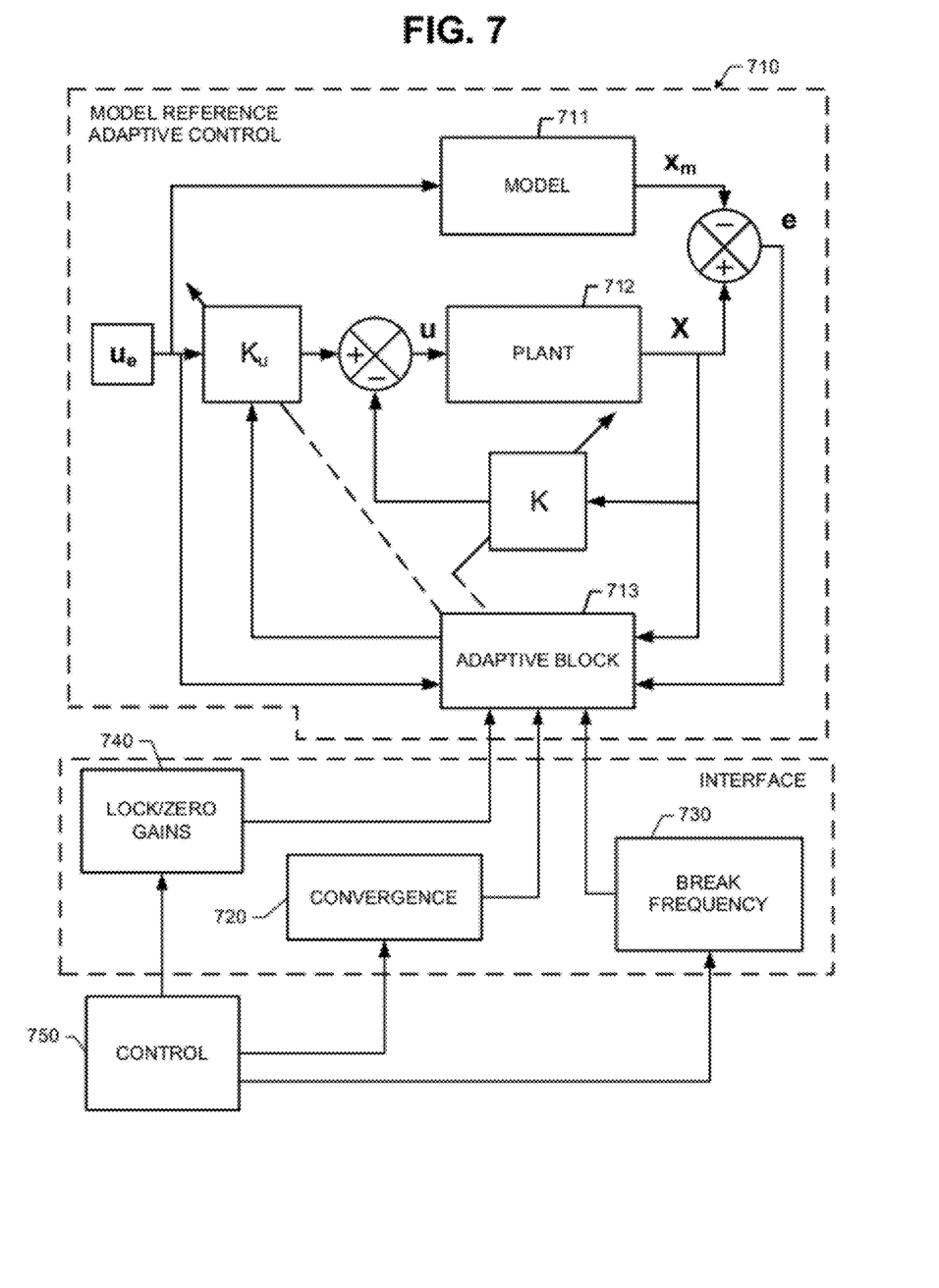
FIG. 7 is an illustration of a model reference adaptive control.

Reference is now made to FIG. 7, which illustrates a method herein with respect to a model reference adaptive control 710 (a typical implementation is illustrated). One implementation of the model reference adaptive control 710 is known as "Multiple Input Minimal Integral Control Synthesis" (MIMICS). An interface to the control 710 includes parameters that can be set or adjusted. These parameters include a convergence factor 720, break frequency 730 and gain lock/zeroing 740. The break frequency 730 is used to derive a model 711 that accounts for the most dominant components of the plant 712. The convergence factor 720 indicates the rate at which the feedback should achieve the command signal once adaptive block 713 is turned on. The gains controls 740 are on or off.

A control 750 operating according to a method herein interfaces with the model reference adaptive control 710 by controlling the convergence, break frequency, and gain controls 720,730 and 740. If the convergence is set too high, there will be oscillations. The control 750 can detect these oscillations and lower the convergence rate.

The control 750 can also cause several gains K and Ku to be adjusted. These gains K and Ku may be set to zero so that the learning phase restarts at a new convergence value. In the control 710 of FIG. 7, the gains K and Ku are controlled by the adaptive block 713 but can be re-zeroed or locked by the control 750 via the gain lock/zeroing 740.

Some embodiments of a control herein can use a compensation filter to adjust phase shift or attenuation in a specific band. Instability can occur when phase margin is low (e.g., feedback phase approaches −180 degrees from the command). The phase adjustment may be one-shot, retriggerable or continuous. In continuous phase adjustment, the phase can be constantly varied so that the phase margin is maintained, thus operating at maximum response although the system parameters (plant) may change. In contrast, conventional systems set the compensation statically.

A method herein may be used with a "bang-bang" controller. If hysteresis of the bang-bang controller is too small, there will be constant overshoots and undershoots of a higher frequency. A method herein may be used to increase the hysteresis setting.

A method herein may be applied to a simple single channel system. One such system is a single axis on a milling machine.

Figure 8:
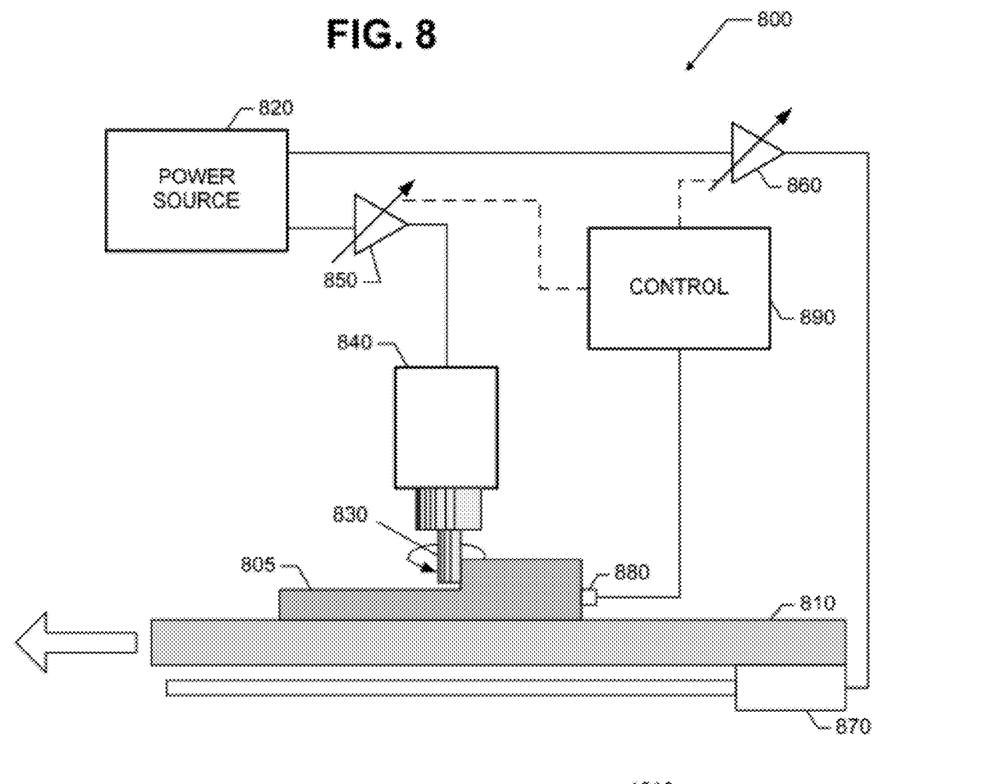
FIG. 8 is an illustration of a milling machine.

Reference is made to FIG. 8, which illustrates a milling machine 800 for machining a part 805. The milling machine 800 includes a table 810 for supporting the part 805, a power source 820, a cutter 830, a cutter motor 840, and a first open loop control 850 for controlling rotational speed of the cutter 830. The milling machine 800 further includes a second open loop control 860 for controlling translational speed of the table 810 (via a feed motor 870) in order to control the feed of the part 805 into the cutter 830. A sensor 880 measures oscillation of the part 805. The sensor 880 may be, for example, an accelerometer that measures vibration of the part 805 as the part 805 is being machined.

Temperature, entrained air, actuator position, etc. can affect parameters in hydraulic and pneumatic control. The size of the part 805 and position of the cutter 830 can affect the parameters on a machining operation as the part 805 is being machined. Feed and speed may be running open loop, and the part 805 may begin to oscillate at its resonance, causing chatter.

The milling machine 800 further includes a control 890 herein for analyzing the output of the sensor 880 according to a method herein. The control 890 detects imminent control instability and takes an action to avoid any instability. For example, the control 890 may appropriately adjust the power to the cutter and feed motors 840 and 870. Even though the milling machine 800 does not go unstable, the oscillations of the part 805 can be used to control the open loop command to the cutter 830 and cutter motor 840.

A method herein is particularly advantageous for a system having multiple channels. One example is a system for controlling forces on an aircraft control surface of an aircraft in a laboratory test.

Figure 9:
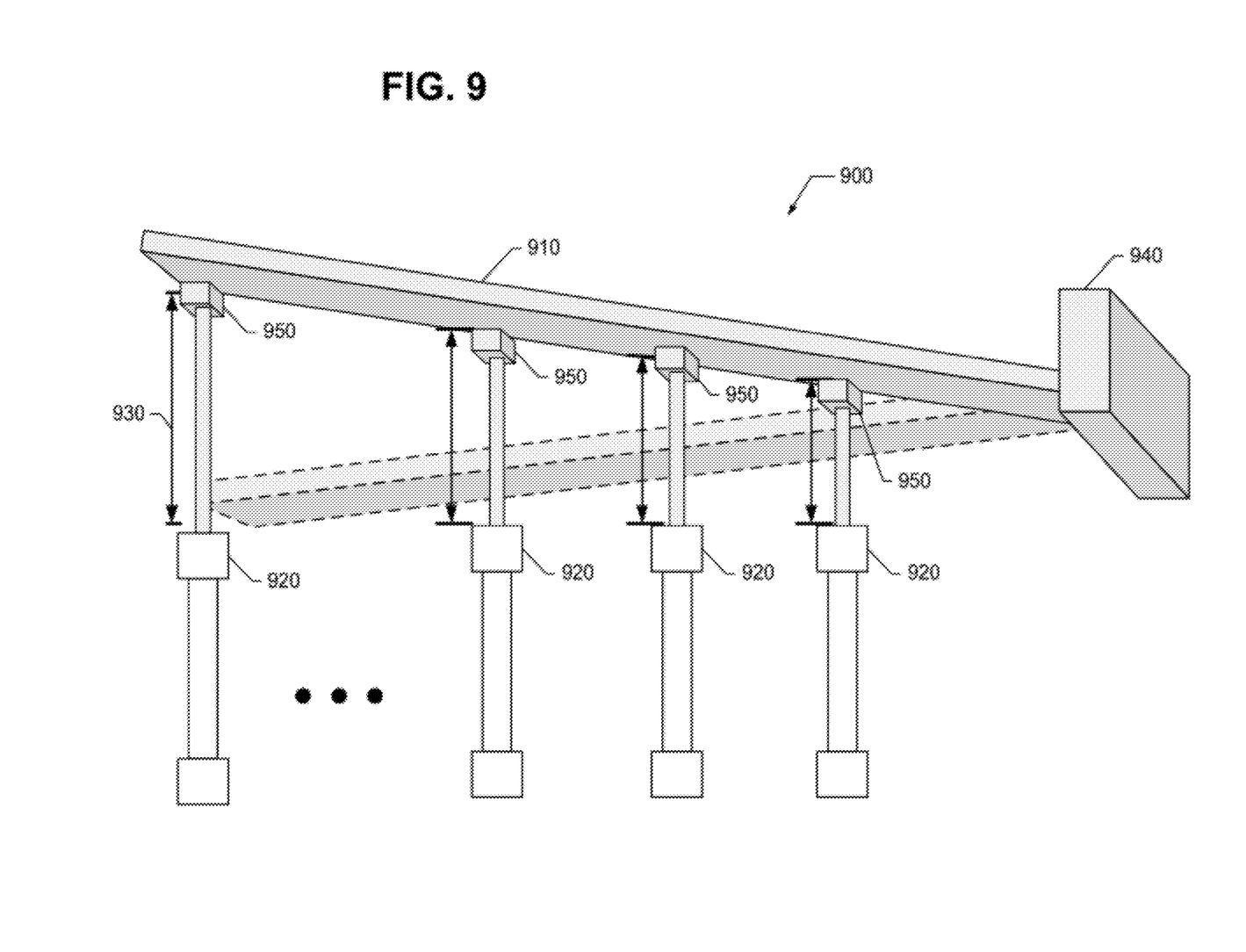
FIG. 9 is an illustration of a hydraulic force system for an aircraft wing.

Reference is now made to FIG. 9, which illustrates a hydraulic force system 900 for a control surface of an aircraft wing 910. The system 900 may be used, for example, to perform fatigue testing of aircraft controlling forces that simulate operation or maximum values based on a design envelope. The system 900 includes multiple channels, with each channel including a force actuator 920 and a control (not shown) that performs a method herein. During the fatigue testing, the force actuators 920 impart loads to one part of the wing 910. For instance, thirty independent force actuators 920 may apply forces simultaneously to the wing 910.

Actuator stroke (represented by the arrows 930) varies as the force is applied to the wing 910. The frequency modes change in spectral location and amplitude as the stroke changes. Since the hydraulic force system 900 has a finite gain margin, it is possible for one channel to go unstable and cause the other channels to also go unstable. Undesirable force oscillations can result.

Force sensors 950, measure the dynamic and static forces on the wing 910 from each channel. The wing 910 may be attached to a strong back 940 or other structural member such as an aircraft fuselage. The force actuators 920 react against a ground reference or other reactionary linkage.

The test cycle frequency may be approximately 1 Hz. Hydraulic resonant frequencies, in this example, are associated with the mass of the wing 910 and the stiffness of the hydraulic fluid. Oscillations are expected to occur in the common hydraulic systems from 10 to 200 Hz. A frequency sweep or an analysis may reveal expected modes of oscillation at a number of frequencies. These resonances vary in their tendency to oscillate and cause instability.

All channels function simultaneously. Each control can respond automatically and immediately lower gains on the unstable channel before other channels are driven into oscillation.

The force control system 900 can save money by avoiding damage to expensive test equipment. Cost of the testing can be reduced by increasing cycle rate. The ability to control the gains within a frequency band enables the slower test frequencies to run while monitoring the oscillations of other modes.

Figure 10:
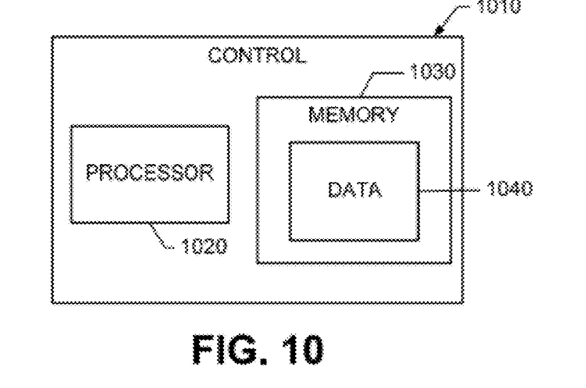
FIG. 10 is an illustration of a hardware implementation of a control for detecting imminent control instability.

Reference is now made to FIG. 10. A control herein is not limited to any particular implementation. For example, the control 1010 may be microprocessor-based. A microprocessor-based control 1010 includes a processor 1020, memory 1030, and data 1040 stored in the memory 1030. When executed, the data 1040 causes the processor 1020 to perform a method herein.

The invention claimed is:

1. A method of detecting imminent control instability in a system that applies stimulus to an object using an actuator, the method comprising:

receiving a signal from the system corresponding to linear oscillations and non-linear oscillations of the object while the stimulus is being applied to the object, the signal including a first frequency component corresponding to a driving frequency and a second frequency component having an amplitude that is lower than amplitude of the first frequency component;

monitoring maximum amplitude of the second frequency component; and taking an action to avoid imminent control instability if the maximum amplitude of the second frequency component persists over a specified period of time.

2. The method of claim 1, wherein a frequency domain representation of the signal is analyzed to identify the second frequency component and at least one additional frequency component having an amplitude that is lower than the amplitude of the first frequency component, the method further comprising monitoring maximum amplitude of each additional component to determine whether control instability is imminent.

3. The method of claim 2, further comprising applying the monitoring of the second frequency component and the at least one additional frequency component to a control to avoid the imminent control instability.

4. The method of claim 3, wherein the second component and the at least one additional component includes a high frequency component, an intermediate frequency component, and a low frequency component, wherein the control is a proportional integral derivative (PID) control; and wherein derivative gain of the control is adjusted automatically in response to a lingering peak of the high frequency component, integral gain and percent contribution are adjusted automatically in response to a lingering peak of the low frequency component, and proportional gain is adjusted in response to the intermediate frequency component.

5. The method of claim 4, wherein the adjustment to the proportional gain is based on the absolute values of real time oscillations in the signal.

6. The method of claim 3, wherein the control is a model reference adaptive control having parameters including convergence rate; and wherein the convergence rate is lowered if the imminent instability is detected.

7. The method of claim 3, wherein the control uses a compensation filter to adjust phase shift in a specific spectral band.

8. The method of claim 1, wherein frequency of the second component is a multiple of frequency of the first component.

9. The method of claim 8, wherein the first frequency component is ignored.

10. The method of claim 1, wherein energy of peaks of the second frequency component and harmonics of the second frequency component are summed, and the sum is compared to a threshold to determine whether control instability is imminent.

11. The method of claim 1, wherein taking the action includes shutting down the system.

12. The method of claim 1, wherein taking the action includes adjusting gain of a control to avoid imminent control instability.

13. The method of claim 1, wherein taking the action includes controlling power to cutter and feed motors to avoid instabilities during machining of a part.

14. The method of claim 1, wherein force is applied to different regions of the object by a plurality of force actuators; wherein parameter signals are generated for the different regions; and wherein each force actuator is independently controlled by monitoring maximum amplitude of the second frequency component in a selected frequency band of the corresponding parameter signal; and taking an action to avoid imminent control instability if the maximum amplitude persists over a specified period of time.

15. The method of claim 14, wherein the object is an aircraft wing having a control surface, wherein the force actuators apply force to the wing during testing, and wherein taking action on an offending force actuator includes lowering control gains before other force actuators are driven into oscillation.

16. A method comprising:
using an actuator to apply a stimulus to an object;
generating a parameter signal representing linear oscillations and non-linear oscillations of the object while the stimulus is being applied to the object;
monitoring maximum amplitude of a dominant tone in each of a plurality of different frequency bands of the parameter signal; and
selectively adjusting control parameters that would otherwise tend to trigger oscillation modes at specific frequencies.

17. A system comprising:
an actuator for applying a stimulus to an object;
a sensor for measuring linear oscillations and non-linear oscillations of the object while the stimulus is being applied to the object; and
a control for monitoring maximum amplitude of a dominant tone in a selected frequency band of the parameter signal, and taking an action to avoid imminent control instability if the maximum amplitude persists over a specified period of time.

18. The system of claim 17, wherein the actuator and the control comprise a plurality of channels, each channel including a force actuator and an actuator control; wherein force is applied to different regions of the object by the channels; wherein parameter signals are generated for the different regions, and wherein each channel is independently controlled by monitoring maximum amplitude of a dominant tone in a selected frequency band of the corresponding parameter signal; and taking an action to avoid imminent control instability if the maximum amplitude exceeds a threshold over a specified period of time.

19. The system of claim 18, wherein the object is an aircraft wing or a control surface, wherein the force actuators operate on different regions of the wing or the control surface during testing, and wherein gain is lowered in an actuator control of an offending channel before the other channels are driven into oscillation.

20. A system comprising:
an actuator for applying a stimulus to an object;
a sensor for measuring a parameter corresponding to linear oscillations and non-linear oscillations of the object while the stimulus is being applied to the object;
a first control having adjustable control parameters that tend to trigger oscillation modes at specific frequencies; and
a second control, responsive to the sensor, for determining maximum amplitude of a dominant tone in each of a plurality of frequency bands of the measured parameter; and automatically adjusting those parameters so as not to trigger those oscillation modes at the specific frequencies.

* * * * *